(12) United States Patent
Cadieux et al.

(10) Patent No.: US 11,800,601 B2
(45) Date of Patent: Oct. 24, 2023

(54) E-VAPING DEVICE CARTRIDGE WITH INTERNAL INFRARED SENSOR

(71) Applicant: Altria Client Services LLC, Richmond, VA (US)

(72) Inventors: Ed Cadieux, Mechanicsville, VA (US); Barry Smith, Hopewell, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 17/730,465

(22) Filed: Apr. 27, 2022

(65) Prior Publication Data
US 2022/0256653 A1 Aug. 11, 2022

Related U.S. Application Data

(63) Continuation of application No. 16/448,391, filed on Jun. 21, 2019, now Pat. No. 11,343,877, which is a
(Continued)

(51) Int. Cl.
*H05B 1/02* (2006.01)
*H05B 3/42* (2006.01)
(Continued)

(52) U.S. Cl.
CPC .......... *H05B 1/0252* (2013.01); *A24F 40/51* (2020.01); *G01J 5/0896* (2013.01);
(Continued)

(58) Field of Classification Search
None
See application file for complete search history.

(56) References Cited

U.S. PATENT DOCUMENTS 4,922,901 A * 5/1990 Brooks ............... A61M 16/109
131/273
4,947,874 A 8/1990 Brooks et al.
(Continued)

FOREIGN PATENT DOCUMENTS

CN 101424938 A 5/2009
CN 101647313 A 2/2010
(Continued)

OTHER PUBLICATIONS

Korean Notice of Allowance for corresponding Application No. 10-2018-7025850, dated Jun. 27, 2022, English translation included.
(Continued)

*Primary Examiner* — Thor S Campbell
(74) *Attorney, Agent, or Firm* — Harness, Dickey & Pierce, P.L.C.

(57) ABSTRACT

A cartridge for an e-vaping device includes an infrared sensor configured to measure infrared radiation emitted by at least a portion of a heating element coupled to a dispensing interface in the cartridge. The field of view of the infrared sensor may encompass an entirety of the heating element. The infrared sensor may be an infrared light emitting diode. The e-vaping device may include control circuitry configured to determine the temperature of the heating element based on sensor data generated by the infrared sensor and control the electrical power supplied to the cartridge based on the temperature of the heating element. The control circuitry may control the electrical power to maintain the temperature of the heating element below a threshold temperature. The control circuitry may determine the heating element temperature based on accessing at least a portion of the sensor data stored at a storage device in the cartridge.

15 Claims, 4 Drawing Sheets

Related U.S. Application Data continuation of application No. 15/075,690, filed on Mar. 21, 2016, now Pat. No. 10,375,993.

(51) Int. Cl.
  *A24F 40/51* (2020.01)
  *A24F 40/10* (2020.01)
  *G01J 5/08* (2022.01)

(52) U.S. Cl.
  CPC ............ *H05B 1/0244* (2013.01); *H05B 3/42* (2013.01); *A24F 40/10* (2020.01)

(56) References Cited

U.S. PATENT DOCUMENTS

| | | | | |
|---|---|---|---|---|
| 4,947,875 | A * | 8/1990 | Brooks | A61M 15/00 131/194 |
| 5,954,979 | A * | 9/1999 | Counts | A24F 40/485 131/194 |
| 6,479,801 | B1 * | 11/2002 | Shigeoka | G01J 5/0887 392/416 |
| 10,042,408 | B2 * | 8/2018 | Cameron | G06F 1/266 |
| 2006/0088301 | A1 * | 4/2006 | Kanzaki | H05B 6/6479 392/386 |
| 2009/0230111 | A1 * | 9/2009 | Richards | G01N 1/2214 392/387 |
| 2010/0313901 | A1 * | 12/2010 | Fernando | B65D 85/1081 131/330 |
| 2012/0227752 | A1 * | 9/2012 | Alelov | A24F 40/51 131/273 |
| 2013/0192619 | A1 * | 8/2013 | Tucker | H01C 17/00 29/611 |
| 2013/0192623 | A1 * | 8/2013 | Tucker | H05B 3/42 131/329 |
| 2013/0255670 | A1 * | 10/2013 | Ott | A61M 16/0051 128/200.14 |
| 2013/0319440 | A1 | 12/2013 | Capuano | |
| 2014/0014126 | A1 | 1/2014 | Peleg et al. | |
| 2014/0060554 | A1 * | 3/2014 | Collett | A24F 40/46 392/386 |
| 2015/0020823 | A1 * | 1/2015 | Lipowicz | A24F 40/42 131/359 |
| 2015/0313275 | A1 * | 11/2015 | Anderson | A24B 15/10 131/352 |
| 2018/0000160 | A1 * | 1/2018 | Taschner | A24F 40/46 |
| 2022/0256653 | A1 * | 8/2022 | Cadieux | G01J 5/0896 |

FOREIGN PATENT DOCUMENTS

| | | |
|---|---|---|
| CN | 104302197 A | 1/2015 |
| CN | 104305527 A | 1/2015 |
| CN | 204157655 U | 2/2015 |
| CN | 104768407 A | 7/2015 |
| CN | 105167203 A | 12/2015 |
| CN | 105188430 A | 12/2015 |
| DE | 202014101125 U1 | 3/2014 |
| WO | WO-2016/001925 A1 | 1/2016 |
| WO | WO-2016/001926 A1 | 1/2016 |

OTHER PUBLICATIONS

"E-cigarette-forum," https://www.e-cigarette.forum.com/forum/threads/vapor-flask-v3-dna40-clone-thread.648907/p. 209, 2015.
International Search Report and Written Opinion for Application No. PCT/EP2017/056724 dated May 30, 2017.
Russian Notice of Allowance and Search Report dated May 20, 2020 for corresponding Russian Application No. 2018136876.
Written Opinion dated Mar. 5, 2018 for corresponding International Application No. PCT/EP2017/056724.
Chinese Office Action dated Oct. 10, 2020 for corresponding Chinese Application No. 201780013763.1, and English-language translation thereof.
Japanese Notice of Rejection dated Mar. 29, 2021 for corresponding Japanese Application No. 2018-549469, and English-language translation thereof.
Japanese Decision to Grant for corresponding Application No. 2018-549469, dated Jun. 28, 2021.
Chinese Office Action dated Jun. 23, 2021 for corresponding Chinese Application No. 201780013763.1, and English-language translation thereof.
Korean Office Action for corresponding Application No. 2018-7025850, dated Nov. 17, 2021, English translation included.
Chinese Office Action for corresponding Application No. 201780013763.1, dated Jan. 11, 2022, and English-language translation thereof.

* cited by examiner

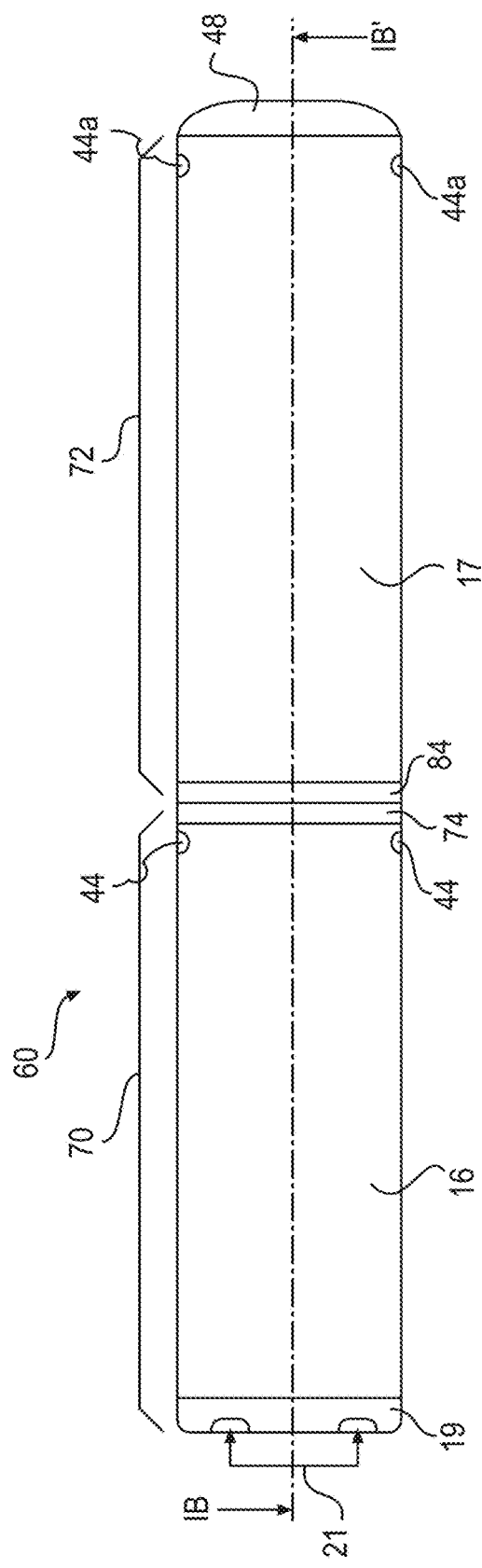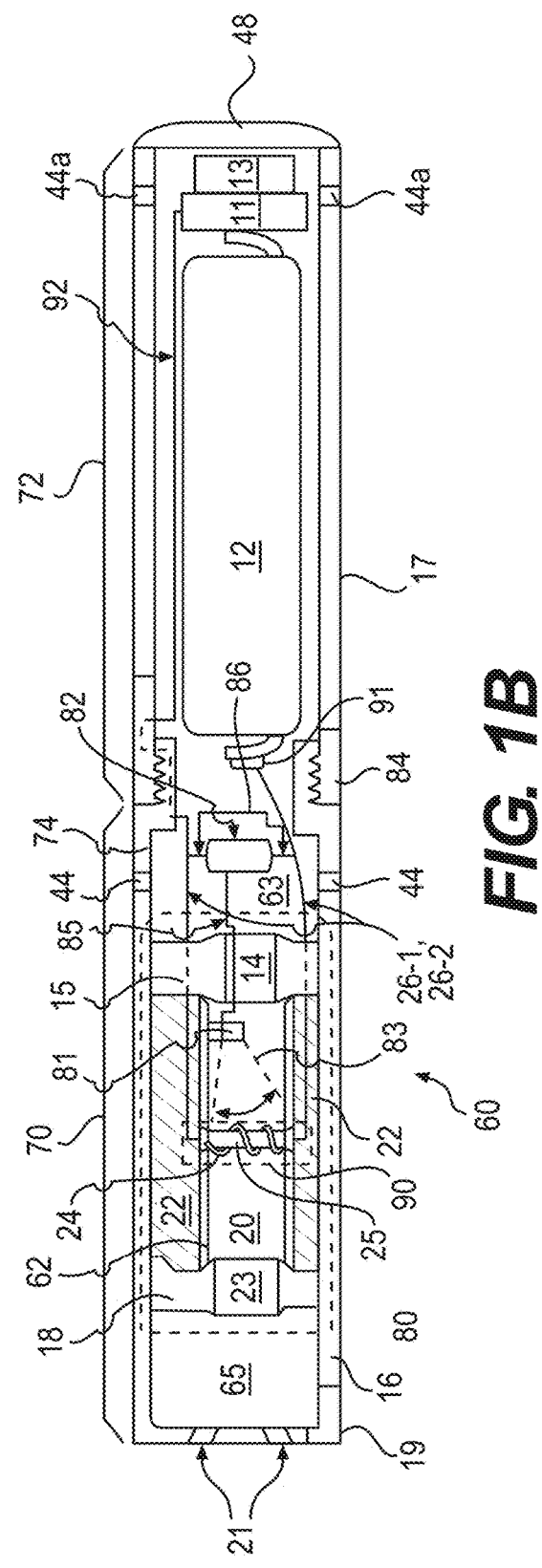

E-VAPING DEVICE CARTRIDGE WITH INTERNAL INFRARED SENSOR

CROSS-REFERENCE TO RELATED APPLICATIONS

This application is a continuation of U.S. application Ser. No. 16/448,391, filed Jun. 21, 2019, which is a continuation application of U.S. application Ser. No. 15/075,690 filed on Mar. 21, 2016, the entire contents of each of which are hereby incorporated by reference.

BACKGROUND

Field

The present disclosure relates to an electronic vaping or e-vaping device.

Description of Related Art

E-vaping devices, also referred to herein as electronic vaping devices (EVDs) may be used by adult vapers for portable vaping. An e-vaping device may vaporize a pre-vapor formulation to form a vapor. The e-vaping device may include a reservoir that holds a pre-vapor formulation and a heating element that vaporizes the pre-vapor formulation by applying heat to at least a portion of the pre-vapor formulation.

In some cases, the heating element may generate excess heat, which may result in an increased temperature in one or more portions of the cartridge. The heating element may generate excess heat due to receiving excessive power for vapor generation. In some cases, the excess heat may be due to a reduction in the amount of pre-vapor formulation in the cartridge. Excessive heat, internal temperatures, etc. may result in an overheat condition in the cartridge. Overheating of the cartridge may result in degradation of one or more of the pre-vapor formulations, formation of one or more reaction products which may detract from the sensory experience when included in a vapor, etc.

SUMMARY

According to some example embodiments, a cartridge for an e-vaping device may include a vaporizer assembly configured to vaporize a pre-vapor formulation to generate a vapor and an infrared sensor. The vaporizer assembly may include a dispensing interface configured to draw the pre-vapor formulation from a reservoir and a heating element coupled to the dispensing interface, the heating element configured to heat the drawn pre-vapor formulation. The infrared sensor may be configured to measure a temperature of at least a portion of the heating element within a field of view based on measuring infrared radiation emitted by the portion of the heating element.

In some example embodiments, the cartridge may include a hollow tube having an inner surface and an outer surface, the vaporizer assembly extending between separate points on the inner surface of the hollow tube, the infrared sensor being coupled to the inner surface of the hollow tube.

In some example embodiments, the infrared sensor may be configured to measure a temperature of at least a portion of the dispensing interface within the field of view based on measuring infrared radiation emitted by the portion of the dispensing interface.

In some example embodiments, the infrared sensor may be configured to measure a temperature of the heating element based on both of the infrared radiation emitted by the portion of the heating element and the infrared radiation emitted by the portion of the dispensing interface.

In some example embodiments, the field of view may encompass an entirety of the heating element.

In some example embodiments, the infrared sensor may include an infrared light emitting diode.

According to some example embodiments, an e-vaping device may include a cartridge and a power supply. The cartridge may include a vaporizer assembly configured to vaporize a pre-vapor formulation to generate a vapor and an infrared sensor. The vaporizer assembly may include a dispensing interface configured to draw the pre-vapor formulation from a reservoir and a heating element coupled to the dispensing interface, the heating element configured to heat the drawn pre-vapor formulation. The infrared sensor may be configured to measure a temperature of at least a portion of the heating element within a field of view based on measuring infrared radiation emitted by the portion of the heating element. The power supply may be configured to supply electrical power to the cartridge.

In some example embodiments, the e-vaping device may include control circuitry configured to adjustably control the electrical power supplied to the cartridge based on the measured temperature of the heating element.

In some example embodiments, the control circuitry may be configured to adjustably control the electrical power supplied to the cartridge to maintain the measured temperature of the heating element below a threshold temperature.

In some example embodiments, the cartridge may include an storage device communicatively coupled to the infrared sensor, the storage device being configured to store sensor data generated by the infrared sensor, and the control circuitry may be configured to adjustably control the electrical power supplied to the cartridge based on accessing at least a portion of the sensor data stored at the storage device.

In some example embodiments, the cartridge may further include a hollow tube having an inner surface and an outer surface, the vaporizer assembly extending between separate points on the inner surface of the hollow tube, the infrared sensor being coupled to the inner surface of the hollow tube.

In some example embodiments, the infrared sensor may be configured to measure a temperature of at least a portion of the dispensing interface within the field of view based on measuring infrared radiation emitted by the portion of the dispensing interface.

In some example embodiments, the infrared sensor may be configured to measure a temperature of the heating element based on both of the infrared radiation emitted by the portion of the heating element and the infrared radiation emitted by the portion of the dispensing interface.

In some example embodiments, the field of view may encompass an entirety of the heating element.

In some example embodiments, the infrared sensor may include an infrared light emitting diode.

In some example embodiments, the power supply may include a rechargeable battery.

According to some example embodiments, a method may include configuring a cartridge to provide sensor data associated with a temperature of at least a portion of a vaporizer assembly included in the cartridge. The configuring may include installing a vaporizer assembly in the cartridge, the vaporizer assembly being configured to vaporize a pre-vapor formulation to generate a vapor, the vaporizer assembly including a dispensing interface and a heating element, the dispensing interface being configured to draw the pre-vapor formulation from a reservoir, the heating element being coupled to the dispensing interface, the heating element being configured to heat the drawn pre-vapor formulation. The configuring may include coupling an infrared sensor to a portion of the cartridge such that at least a portion of the heating element is within a field of view of the infrared sensor, the infrared sensor being configured to measure infrared radiation emitted within the field of view, the infrared sensor further configured to generate the sensor data based on the measured infrared radiation.

In some example embodiments, the configuring may include coupling the infrared sensor to a portion of the cartridge such that an entirety of the heating element is within the field of view of the infrared sensor.

In some example embodiments, the cartridge may include a hollow tube having an inner surface and an outer surface. The configuring may include coupling the vaporizer assembly to the hollow tube such that the vaporizer assembly extends between separate points on the inner surface of the hollow tube. The configuring may include coupling the infrared sensor to the inner surface of the hollow tube.

In some example embodiments, the infrared sensor may include an infrared light emitting diode.

BRIEF DESCRIPTION OF THE DRAWINGS

The various features and advantages of the non-limiting embodiments described herein become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A is a side view of an e-vaping device, according to some example embodiments.

FIG. 1B is a cross-sectional view along line IB-IB' of the e-vaping device of FIG. 1A.

DETAILED DESCRIPTION OF EXAMPLE EMBODIMENTS

Figure 2:
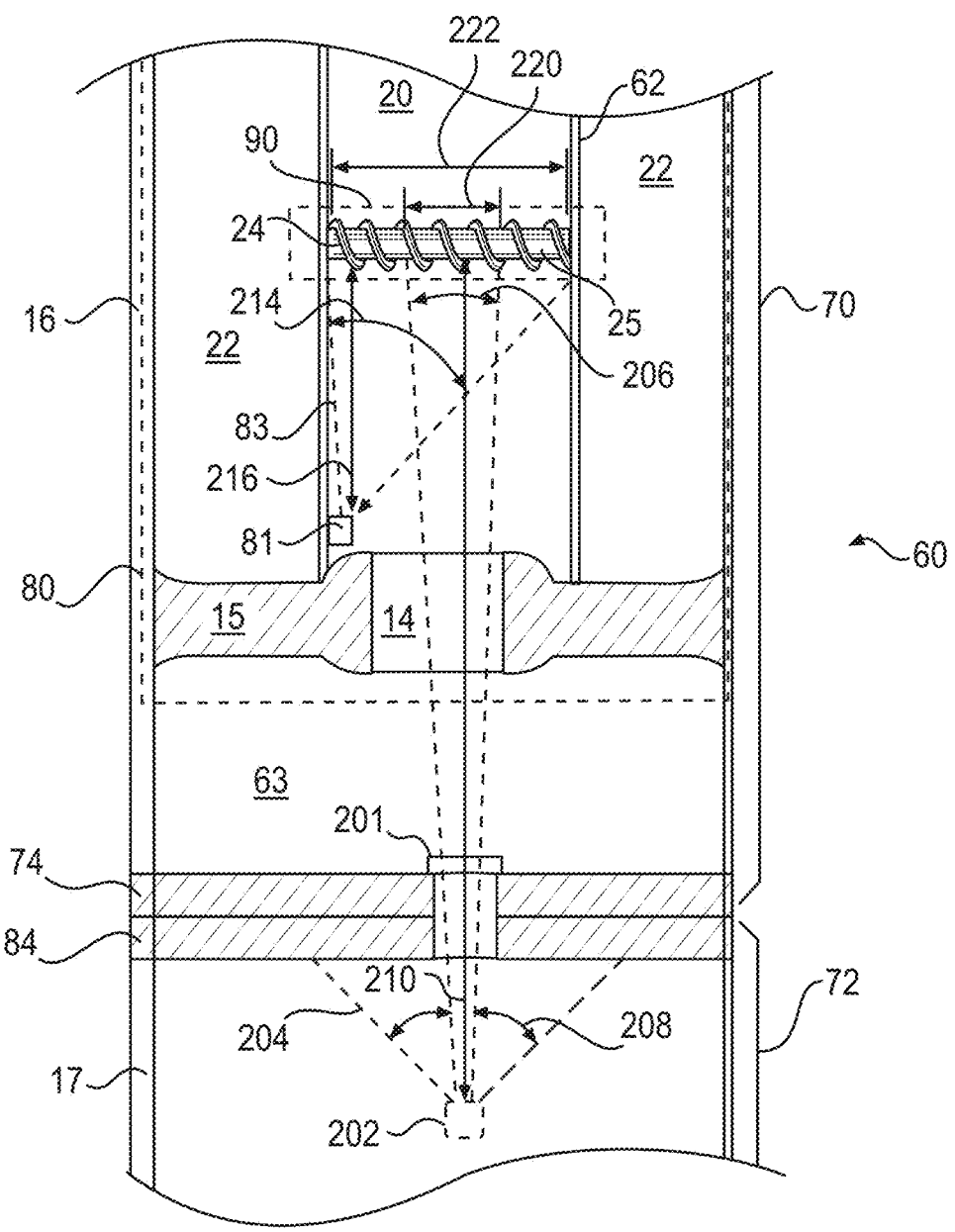
FIG. 2 is a cross-sectional view of an e-vaping device including an infrared sensor that is internal to the vapor generator within a cartridge, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a side view of an e-vaping device 60, according to some example embodiments. FIG. 1B is a cross-sectional view along line IB-IB' of the e-vaping device 60 of FIG. 1A. The e-vaping device 60 may include one or more of the features set forth in U.S. Patent Application Publication No. 2013/0192623 to Tucker et al. filed Jan. 31, 2013 and U.S. Patent Application Publication No. 2013/0192619 to Tucker et al. filed Jan. 14, 2013, the entire contents of each of which are incorporated herein by reference thereto. As used herein, the term "e-vaping device" is inclusive of all types of electronic vaping devices, regardless of form, size or shape.

Referring to FIG. 1A and FIG. 1B, the illustrated e-vaping device 60 includes a replaceable cartridge (or first section) 70 and a reusable power supply section (or second section) 72. The cartridge 70 and power supply section 72 may be removably coupled together at complimentary interfaces 74, 84 of the respective cartridge 70 and power supply section 72.

In some example embodiments, the interfaces 74, 84 are threaded connectors. It should be appreciated that each interface 74, 84 may be any type of connector, including a snug-fit, detent, clamp, bayonet, and/or clasp. One or more of the interfaces 74, 84 may include a cathode connector, anode connector, some combination thereof, etc. to electrically couple one or more elements of the cartridge 70 to one or more power supplies 12 in the power supply section 72 when the interfaces 74, 84 are coupled together.

An outlet end insert 19 is positioned at an outlet end of the cartridge 70. The outlet end insert 19 includes at least one outlet port 21 that may be located off-axis from the longitudinal axis of the e-vaping device 60. The outlet port 21 may be angled outwardly in relation to the longitudinal axis of the e-vaping device 60. Multiple outlet ports 21 may be substantially uniformly distributed about the perimeter of the outlet end insert 19 so as to substantially uniformly distribute vapor drawn through the outlet end insert 19 during vaping. Thus, as a vapor is drawn through the outlet end insert 19, the vapor may move in different directions.

The cartridge 70 includes an outer housing 16 extending in a longitudinal direction and an inner tube (or chimney) 62 coaxially positioned within the outer housing 16. The power supply section 72 includes an outer housing 17 extending in a longitudinal direction. In some example embodiments, the outer housing 16 may be a single tube housing both the cartridge 70 and the power supply section 72 and the entire e-vaping device 60 may be disposable.

The outer housings 16, 17 may each have a generally cylindrical cross-section. In some example embodiments, the outer housings 16, 17 may each have a generally triangular cross-section along one or more of the cartridge 70 and the power supply section 72. In some example embodiments, the outer housing 17 may have a greater circumference or dimensions at a tip end than a circumference or dimensions of the outer housing 16 at an outlet end of the e-vaping device 60.

At one end of the inner tube 62, a nose portion of a gasket (or seal) 15 is fitted into an end portion of the inner tube 62. An outer perimeter of the gasket 15 provides a substantially airtight seal with an interior surface of the outer housing 16. The gasket 15 includes a channel 14. The channel 14 opens into an interior of the inner tube 62 that defines a central channel 20. A space 63 at a backside portion of the gasket 15 may assure communication between the channel 14 and one or more air inlet ports 44. Air may be drawn into the space 63 in the cartridge 70 via the one or more air inlet ports 44 during vaping, and the channel 14 may enable such air to be drawn into the central channel 20.

In some example embodiments, a nose portion of another gasket 18 is fitted into another end portion of the inner tube 62. An outer perimeter of the gasket 18 provides a substantially tight seal with an interior surface of the outer housing 16. The gasket 18 includes a channel 23 disposed between the central channel 20 of the inner tube 62 and a space 65 at an outlet end of the outer housing 16. The channel 23 may transport a vapor from the central channel 20 to the space 65 to exit the cartridge 70 via the outlet end insert 19.

In some example embodiments, at least one air inlet port 44 may be formed in the outer housing 16, adjacent to the interface 74 to reduce and/or minimize the chance of an adult vaper's fingers occluding one of the ports 44 and to control the resistance-to-draw (RTD) during vaping. In some example embodiments, the air inlet ports 44 may be machined into the outer housing 16 with precision tooling such that their diameters are closely controlled and replicated from one e-vaping device 60 to the next during manufacture.

In a further example embodiment, the air inlet ports 44 may be drilled with carbide drill bits or other high-precision tools and/or techniques. In yet a further example embodiment, the outer housing 16 may be formed of metal or metal alloys such that the size and shape of the air inlet ports 44 may not be altered during manufacturing operations, packaging, and vaping. Thus, the air inlet ports 44 may provide consistent RTD. In yet a further example embodiment, the air inlet ports 44 may be sized and configured such that the e-vaping device 60 has a RTD in the range of from about 60 mm $H_2O$ to about 150 mm $H_2O$.

Still referring to FIG. 1A and FIG. 1B, the cartridge 70 includes a vapor generator 80. The vapor generator 80 includes a reservoir 22 and a vaporizer assembly 90. The vaporizer assembly 90 is coupled to the reservoir 22. The vaporizer assembly 90 includes a dispensing interface 25 and a heating element 24.

The reservoir 22 is configured to hold one or more pre-vapor formulations. The space defined between the gaskets 15 and 18 and the outer housing 16 and the inner tube 62 may establish the confines of the reservoir 22. Thus, the reservoir 22 may be contained in an outer annulus between the inner tube 62 and the outer housing 16 and between the gaskets 15 and 18. The reservoir 22 may at least partially surround the central channel 20. The reservoir 22 may include a storage medium configured to store the pre-vapor formulation therein. The storage medium may include a winding of cotton gauze or other fibrous material about a portion of the cartridge 70.

The dispensing interface 25 is coupled to the reservoir 22. The dispensing interface 25 may extend transversely across the central channel 20 between opposing portions of the reservoir 22. In some example embodiments, the dispensing interface 25 may extend parallel to a longitudinal axis of the central channel 20. In some example embodiments, the dispensing interface 25 may extend orthogonally to the longitudinal axis of the central channel 20. The dispensing interface 25 is configured to draw one or more pre-vapor formulations from the reservoir 22. Pre-vapor formulation drawn from the reservoir 22 into the dispensing interface 25 may be drawn into an interior of the dispensing interface 25.

It will be understood, therefore, that pre-vapor formulation drawn from a reservoir 22 into a dispensing interface 25 may include pre-vapor formulation held in the dispensing interface 25.

The pre-vapor formulation drawn from the reservoir 22 into the dispensing interface 25 may be vaporized from the dispensing interface 25 based on heat generated by the heating element 24. During vaping, pre-vapor formulation may be transferred from the reservoir 22 and/or storage medium in the proximity of the heating element 24 through capillary action of the dispensing interface 25.

The heating element 24 is coupled to the dispensing interface 25 such that the heating element 24 is coupled to an outer surface of the dispensing interface 25. The heating element 24 may extend transversely across the central channel 20 between opposing portions of the reservoir 22. In some example embodiments, the heating element 24 may extend parallel to a longitudinal axis of the central channel 20. In some example embodiments, the heating element 24 may extend orthogonally to the longitudinal axis of the central channel 20. The heating element 24 is configured to generate heat when activated. The heating element 24 may heat one or more portions of the dispensing interface 25, including at least some of the pre-vapor formulation held in the dispensing interface 25, to vaporize the at least some of the pre-vapor formulation held in the dispensing interface 25.

The heating element 24 may at least partially surround a portion of the dispensing interface 25 such that when the heating element 24 is activated, one or more pre-vapor formulations in the dispensing interface 25 may be vaporized by the heating element 24 to form a vapor. In some example embodiments, including the example embodiment illustrated in FIG. 1B, the heating element 24 completely surrounds the dispensing interface 25.

Figure 3:
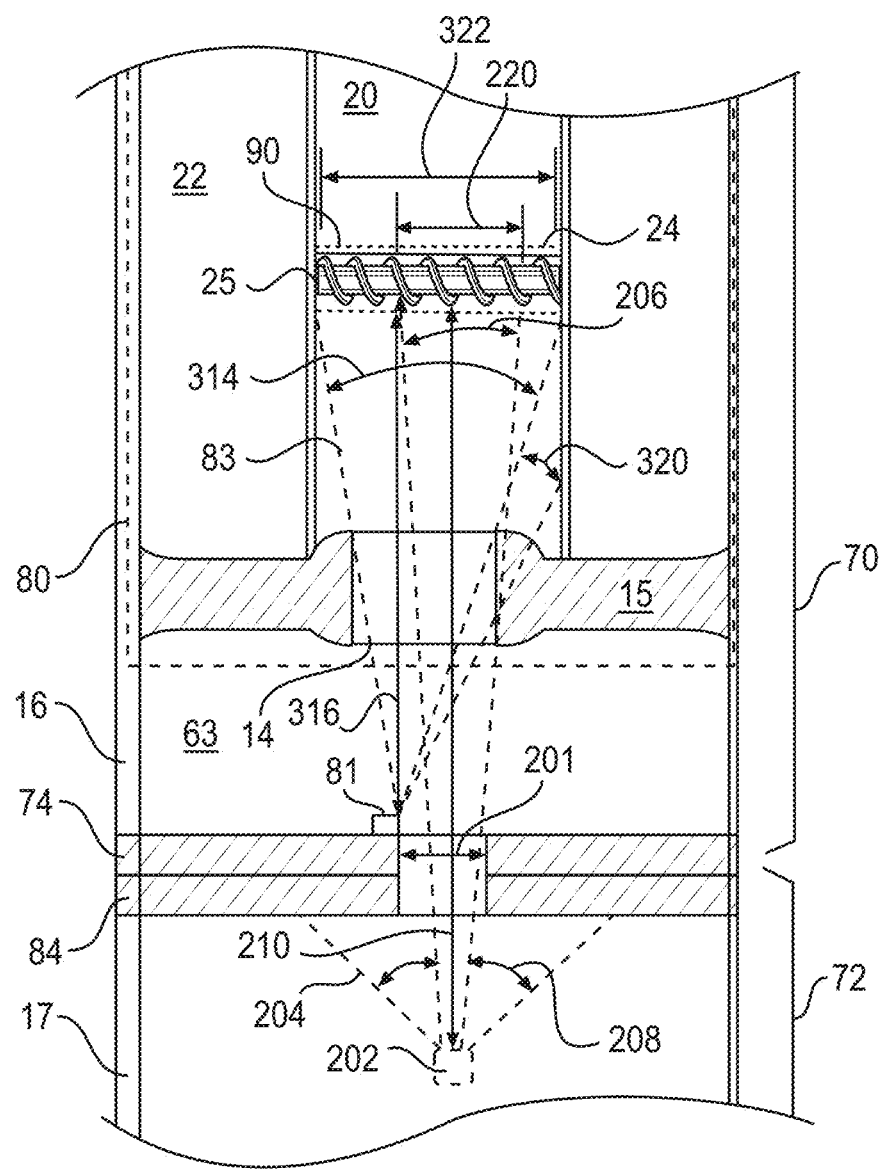
FIG. 3 is a cross-sectional view of an e-vaping device including an infrared sensor that is within a cartridge and external to the vapor generator, according to some example embodiments.

In some example embodiments, including the example embodiment shown in FIG. 1B, and as shown further with reference to FIG. 2 and FIG. 3, the heating element 24 includes a heater coil wire that extends around the outer surface of the dispensing interface 25.

The heating element 24 may heat one or more pre-vapor formulations in the dispensing interface 25 through thermal conduction. Alternatively, heat from the heating element 24 may be conducted to the one or more pre-vapor formulations by a heat conductive element or the heating element 24 may transfer heat to the incoming ambient air that is drawn through the e-vaping device 60 during vaping, which in turn heats the pre-vapor formulation by convection.

Still referring to FIG. 1A and FIG. 1B, the cartridge 70 includes an infrared sensor 81. The infrared sensor 81 is configured to measure a temperature of at least a portion of the vaporizer assembly 90 based on measuring infrared radiation emitted by one or more portions of the vaporizer assembly 90. Because the vaporizer assembly 90 includes the heating element 24 and the dispensing interface 25, the infrared sensor 81 is configured to measure a temperature of at least one portion of the heating element 24 and/or at least one portion of the dispensing interface 25.

The infrared sensor 81 has a field of view 83. The infrared sensor 81 is configured to measure infrared radiation emitted by one or more radiation sources located within the field of view 83. Because one or more portions of the vaporizer assembly 90 are located within the field of view 83, the infrared sensor 81 is configured to measure infrared radiation emitted by the one or more portions of the vaporizer assembly 90.

In some example embodiments, the infrared sensor 81 is configured to measure a temperature of at least a portion of the vaporizer assembly 90 based on an average temperature of one or more portions of the vaporizer assembly 90 within the field of view 83. Such portions may include at least a portion of the heating element 24 and at least a portion of the dispensing interface 25, such that the infrared sensor 81 measures a temperature of the vaporizer assembly 90 based on measuring temperatures of one or more portions of the heating element 24 and the dispensing interface 25.

In some example embodiments, the field of view 83 may encompass an entirety of the vaporizer assembly 90. As a result, the infrared sensor 81 may be configured to measure a temperature of an entirety of at least one of the heating element 24 and the dispensing interface 25 extending through the central channel 20.

In some example embodiments, the infrared sensor 81 is configured to measure a temperature of the heating element 24 based on measuring infrared radiation emitted by one or more portions of both the heating element 24 and the dispensing interface 25 located within the field of view 83. As a result, the infrared sensor 81 may measure infrared radiation emitted from the heating element 24 both directly and indirectly to determine a temperature of one or more portions of the heating element 24.

In some example embodiments, the infrared sensor 81 is configured to simultaneously measure separate, respective temperatures of multiple separate radiation sources located within the field of view 83. For example, when multiple portions of the heating element 24 are within the field of view 83, the infrared sensor 81 may measure separate temperatures based on infrared radiation emitted by the respective portions of the heating element 24.

In some example embodiments, the infrared sensor 81 measures a temperature of an element based on measuring respective temperatures of multiple separate portions of the element. The infrared sensor 81 may measure a temperature of the element based on processing the multiple measured temperatures to determine the measured temperature of the element.

For example, the infrared sensor 81 may measure a temperature of the heating element 24 based on measuring one or more respective temperatures of multiple separate portions of the heating element 24 that are within the field of view 83. The infrared sensor 81 may determine a measured temperature of the heating element 24 based on determining an average value of multiple respective measured temperatures of the multiple portions of the heating element 24.

In some example embodiments, the infrared sensor 81 is configured to generate sensor data based on measuring a temperature of at least one radiation source located within the field of view 83. The sensor data may include data indicating the measured temperature of one or more particular radiation sources located at one or more particular respective portions of the field of view 83.

In some example embodiments, the cartridge 70 includes a storage device 82 communicatively coupled to the infrared sensor 81 via one or more leads 85. The storage device 82 may store sensor data generated by the infrared sensor 81. The storage device 82 may generate and manage a historical record of temperatures measured by the infrared sensor 81 in one or more portions of the field of view 83. The historical record may be a database of measured temperatures associated with associated time periods of the respective measured temperatures and field of view 83 coordinates associated with the respective measured temperatures.

In some example embodiments, as described further below with reference to FIG. 2 and FIG. 3, the infrared sensor 81 may have an unobstructed field of view 83 of the vaporizer assembly 90 based on the infrared sensor 81 being included in the cartridge 70, relative to an infrared sensor 81 that is external to the cartridge 70. In addition, the infrared sensor 81 may have reduced separation from the vaporizer assembly 90, based on the infrared sensor 81 being included in the cartridge 70, relative to an infrared sensor 81 that is external to the cartridge 70. Furthermore, the field of view 83 may be at least partially restricted from becoming obstructed by various materials during and after vaping, based on the infrared sensor 81 being included in the cartridge 70, relative to an infrared sensor 81 that is external to the cartridge 70.

An unobstructed field of view 83 and reduced spacing (i.e., improved proximity) of the infrared sensor 81 to the vaporizer assembly 90 may configure the infrared sensor 81 to measure temperatures of one or more portions of the vaporizer assembly 90 with improved accuracy and precision, relative to an infrared sensor 81 that is external to the cartridge 70.

An e-vaping device 60 that includes such an infrared sensor 81 may thus be configured to implement temperature-based control of electrical power supplied to the heating element 24 with improved accuracy and precision.

Such an e-vaping device 60 may be configured to provide an improved sensory experience during vaping. For example, the e-vaping device 60 may be configured to control the supply of electrical power to the heating element 24 to mitigate a probability of overheating pre-vapor formulation during vaping, where such overheating may induce chemical reactions involving the pre-vapor formulation to produce reaction products. Such reaction products may detract from the sensory experience provided by the e-vaping device 60 during vaping. In addition, such an e-vaping device 60 may be configured to provide improved operational lifetime of one or more portions of the e-vaping device 60.

Still referring to FIG. 1A and FIG. 1B, the cartridge 70 includes a connector element 91 configured to at least partially establish electrical connections between elements in the cartridge 70 with one or more elements in the power supply section 72. In some example embodiments, the connector element 91 includes an electrode element configured to electrically couple at least one electrical lead to the power supply 12 in the power supply section 72 when interfaces 74, 84 are coupled together. In the example embodiment illustrated in FIG. 1B, for example, electrical lead 26-1 is coupled to connector element 91. An electrode element may be one or more of a cathode connector element and an anode connector element. If and/or when interfaces 74, 84 are coupled together, the connector element 91 may be coupled with at least one portion of the power supply 12, as shown in FIG. 1B.

In some example embodiments, one or more of the interfaces 74, 84 include one or more of a cathode connector element and an anode connector element. In the example embodiment illustrated in FIG. 1B, for example, electrical lead 26-2 is coupled to the interface 74. As further shown in FIG. 1B, the power supply section 72 includes a lead 92 that couples the control circuitry 11 to the interface 84. If and/or when interfaces 74, 84 are coupled together, the coupled interfaces 74, 84 may electrically couple leads 26-2 and 92 together.

If and/or when an element in the cartridge 70 is coupled to both leads 26-1 and 26-2, an electrical circuit through the cartridge 70 and power supply section 72 may be established. The established electrical circuit may include at least the element in the cartridge 70, control circuitry 11, and the power supply 12. The electrical circuit may include leads 26-1 and 26-2, lead 92, and interfaces 74, 84.

In the example embodiment illustrated in FIG. 1B, heating element 24, infrared sensor 81, and storage device 82 are coupled to interface 74 and connector element 91, such that the heating element 24, infrared sensor 81, and storage device 82 may be electrically coupled to the power supply 12 via interface 74 and connector element 91 if and/or when interfaces 74, 84 are coupled together.

The control circuitry 11, described further below, is configured to be coupled to the power supply 12, such that the control circuitry 11 may control the supply of electrical power from the power supply 12 to one or more elements of the cartridge 70. The control circuitry 11 may control the supply of electrical power to the element based on controlling the established electrical circuit. For example, the control circuitry 11 may selectively open or close the electrical circuit, adjustably control an electrical current through the circuit, etc.

In some example embodiments, the storage device 82 is coupled to one or more of the interface 74 and connector element 91 through one or more leads 86. The leads 86 may be coupled to at least one of interface 74 and connector element 91 through one or more of leads 86 and leads 26-1 and 26-2. In the example embodiment illustrated in FIG. 1B, for example, the storage device 82 is coupled to interface 74 and connector element 91 via leads 86 that are coupled to leads 26-1 and 26-2, respectively.

In some example embodiments, including the example embodiment illustrated in FIG. 1B, a storage device 82 is included within the cartridge 70. Infrared sensor 81 may be coupled to the storage device 82 though leads 85. The infrared sensor 81 may be configured to receive electrical power from the power supply 12 through the storage device 82 and leads 85 if and/or when interfaces 74, 84 are coupled together.

In some example embodiments, the storage device 82 may be coupled to interface 74 and connector element 91 through one or more electrical leads 86, such that the storage device 82 may be electrically coupled to at least the power supply 12 and the control circuitry 11 if and/or when the interfaces 74, 84 are coupled together. In the example embodiment illustrated in FIG. 1B, for example, storage device 82 is coupled to connector element 91 through a lead 86 coupled to lead 26-1, an storage device 82 is further coupled to interface 74 through a lead 86 coupled to lead 26-2.

In some example embodiments, the infrared sensor 81 may be electrically coupled to the power supply 12 independently of the storage device 82. For example, the infrared sensor 81 may be coupled to interface 74 and connector element 91 through one or more electrical leads 85 that bypass the storage device 82. Such one or more electrical leads 85 may directly couple with one or more of connector element 91 and interface 74. Such one or more electrical leads 85 may couple with one or more of leads 26-1 and 26-2 such that the infrared sensor 81 may be coupled to interface 74 and connector element 91 through one or more of the leads 26-1 and 26-2.

In some example embodiments, the storage device 82 is absent from the cartridge 70 and the infrared sensor 81 is coupled to interface 74 and connector element 91 through at least electrical leads 85. The electrical leads 85 may be coupled to one or more of leads 26-1 and 26-2.

Still referring to FIG. 1A and FIG. 1B, the power supply section 72 includes a sensor 13 responsive to air drawn into the power supply section 72 through an air inlet port 44*a* adjacent to a free end or tip end of the e-vaping device 60, a power supply 12, and control circuitry 11. The power supply 12 may include a rechargeable battery. The sensor 13 may be one or more of a pressure sensor, a microelectromechanical system (MEMS) sensor, etc.

In some example embodiments, the power supply 12 includes a battery arranged in the e-vaping device 60 such that the anode is downstream of the cathode. A connector element 91 contacts the downstream end of the battery. The heating element 24 is connected to the power supply 12 by two spaced apart electrical leads 26-1 to 26-2 coupled to connector element 91.

The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The e-vaping device 60 may be usable until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the e-vaping device 60, an USB charger or other suitable charger assembly may be used.

Still referring to FIG. 1A and FIG. 1B, upon completing the connection between the cartridge 70 and the power supply section 72, the power supply 12 may be electrically connected with the heating element 24 of the cartridge 70 upon actuation of the sensor 13. Air is drawn primarily into the cartridge 70 through one or more air inlet ports 44. The one or more air inlet ports 44 may be located along the outer housing 16 or at one or more of the coupled interfaces 74, 84.

The sensor 13 may be configured to sense an air pressure drop and initiate application of voltage from the power supply 12 to the heating element 24. In some example embodiments, the sensor 13 may be at least one of a MEMS sensor, a pressure sensor, and a negative pressure sensor. The control circuitry 11 may also include a heater activation light 48 configured to glow when the heating element 24 is activated. The heater activation light 48 may include a light emitting diode (LED). Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. As shown in FIG. 1A and FIG. 1B, the heater activation light 48 may be located on the tip end of the e-vaping device 60. In some example embodiments, the heater activation light 48 may be located on a side portion of the outer housing 17.

In addition, the at least one air inlet port 44*a* may be located adjacent the sensor 13, such that the sensor 13 may sense air flow indicative of an adult vaper initiating a vaping and activates the power supply 12 and the heater activation light 48 to indicate that the heating element 24 is working.

The control circuitry 11 may supply electrical power to the heating element 24 responsive to the sensor 13. In some example embodiments, the control circuitry 11 is configured to adjustably control the electrical power supplied to one or more elements. Adjustably controlling the supply of electrical power may include supplying electrical power having a determined set of characteristics, where the determined set of characteristics may be adjusted. To adjustably control the supply of electrical power, the control circuitry 11 may control the power supply 12 such that the power supply 12 supplies electrical power having one or more characteristics determined by the control circuitry 11. Such one or more selected characteristics may include one or more of voltage, and current of the electrical power. Such one or more selected characteristics may include a magnitude of the electrical power. It will be understood that adjustably controlling the supply of electrical power may include determining a set of characteristics of electrical power and controlling the power supply 12 such that the power supply 12 supplies electrical power having the determined set of characteristics.

In some example embodiments, the control circuitry 11 may include a maximum, time-period limiter. In some example embodiments, the control circuitry 11 may include a manually operable switch for an adult vaper to initiate a vaping. The time-period of the electric current supply to the heating element 24 may be pre-set depending on the amount of pre-vapor formulation desired to be vaporized. In some example embodiments, the control circuitry 11 may supply power to the heating element 24 as long as the sensor 13 detects a pressure drop.

To control the supply of electrical power to a heating element 24, the control circuitry 11 may execute one or more instances of computer-executable program code. The control circuitry 11 may include a processor and a memory. The memory may be a computer-readable storage medium storing computer-executable code. Supplying power to a heating element 24 may be referred to herein interchangeably as activating the heating element 24.

The control circuitry 11 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 11 may be at least one of an application-specific integrated circuit (ASIC) and an ASIC chip.

The control circuitry 11 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

The control circuitry 11 may include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

Still referring to FIG. 1A and FIG. 1B, when activated, the heating element 24 may heat a portion of the dispensing interface 25 surrounded by the heating element 24 for less than about 10 seconds. Thus, the power cycle (or maximum vaping length) may range in period from about 2 seconds to about 10 seconds (e.g., about 3 seconds to about 9 seconds, about 4 seconds to about 8 seconds or about 5 seconds to about 7 seconds).

In some example embodiments, sensor data generated by the infrared sensor 81 is communicated to control circuitry 11. The sensor data may be communicated as electrical signals. The sensor data may be communicated from the infrared sensor 81 to the control circuitry 11 through one or more electrical leads, electrode elements, and elements through which the infrared sensor 81 and control circuitry 11 are electrically coupled. In the example embodiment illustrated in FIG. 1B, for example, sensor data may be communicated from the infrared sensor 81 to the control circuitry 11 through leads 85, storage device 82, at least one of leads 86, lead 26-2, interfaces 74, 84, and lead 92.

As shown in FIG. 1B, sensor data may be communicated from the infrared sensor 81 to the storage device 82 through leads 85, and sensor data may be communicated from the storage device 82 to the control circuitry 11 through one or more leads 86, lead 26-2, interfaces 74, 84, and lead 92.

In some example embodiments, the cartridge 70 is configured to communicatively couple one or more of the infrared sensor 81 and the storage device 82 to the control circuity 11 when interfaces 74, 84 are coupled to each other.

In some example embodiments, the control circuitry 11 may be configured to adjustably control an amount of electrical power supplied to the heating element 24 based on a measured temperature of at least a portion of the vaporizer assembly 90. Such a portion of the vaporizer assembly 90 may include at least a portion of the heating element 24. The control circuitry 11 may be configured to determine a temperature of at least a portion of the vaporizer assembly 90 based on sensor data generated by the infrared sensor 81, where the sensor data indicates a temperature of the portion of the vaporizer assembly 90.

When the portion of the vaporizer assembly 90 located within the field of view 83 is a portion of the heating element 24, the infrared sensor 81 may generate sensor data indicating a measured temperature of the portion of the heating element 24 based on measuring infrared radiation emitted by the portion of the heating element 24. The control circuitry 11 may determine a measured temperature of the portion of the heating element 24 based on sensor data generated by the infrared sensor 81. The control circuitry 11 may further be configured to adjustably control an amount of electrical power supplied to the heating element 24 based on the measured temperature of the portion of the heating element 24.

In some example embodiments, the control circuitry 11 may access one or more of sensor data, historical records, etc. stored at the storage device 82. The control circuitry 11 may further be configured to adjustably control an amount of electrical power supplied to the heating element 24 based on one or more of historical records and sensor data stored at the storage device 82.

The control circuitry 11 may adjustably control the supply of electrical power to the heating element 24 to control an amount of heat generated by the heating element 24. The control circuitry 11 may adjustably control the supply of electrical power based on a relationship between the amount of electrical power supplied to the heating element 24 and a measured temperature of one or more portions of the vaporizer assembly 90. In some example embodiments, the control circuitry 11 may adjustably control the supply of electrical power based on a relationship between the amount of electrical power supplied to the heating element 24 and a measured temperature of one or more portions of the heating element 24.

In some example embodiments, a relationship between the amount of electrical power supplied to the heating element 24 and a measured temperature of one or more portions of the vaporizer assembly 90 may be stored in a lookup table ("LUT"). The LUT may include an array of temperature values and associated electrical power values. For example, the LUT may include a set of temperature values, and the array may associate each separate temperature value with a separate electrical power value.

The separate electrical power values corresponding to each of the separate values of temperature in the array may be determined experimentally. For example, an amount of power supplied to the heating element 24 may be measured concurrently with a temperature of one or more portions of the vaporizer assembly 90 being measured. The concurrently-measured temperature and amount of electrical power may be entered into the array of the LUT.

The control circuitry 11 may access the LUT to determine an electrical power value that is associated with a measured temperature of one or more portions of the vaporizer assembly 90. The control circuitry 11 may control the supply of electrical power to the heating element 24 according to the determined electrical power value. For example, the control circuitry 11 may determine, based on sensor data communicated from at least one of the infrared sensor 81 and the storage device 82, a value of a measured temperature of the vaporizer assembly 90. The control circuitry 11 may access the LUT and search for an electrical power value that is associated with the value of the measured temperature in the array. Upon identifying the associated electrical power value, the control circuitry 11 may control the supply of electrical power to the heating element 24 such that the amount of electrical power supplied to the heating element 24 is the identified electrical power value.

The LUT may be stored at a storage device included in at least one of the control circuitry 11 and the storage device 82. The control circuitry 11 may access the LUT based on determining a value of a measured temperature of one or more portions of the vaporizer assembly 90.

In some example embodiments, the control circuitry 11 is configured to adjustably control the supply of electrical power to the heating element 24 to control the temperature of one or more portions of the vaporizer assembly 90. Such one or more portions of the vaporizer assembly 90 may include one or more portions of the dispensing interface 25 and pre-vapor formulation held therein. As a result, the control circuitry 11 may be configured to adjustably control the supply of electrical power to the heating element 24 to control the temperature of one or more portions of the dispensing interface 25 and pre-vapor formulation held therein.

The control circuitry 11 may adjustably control the supply of electrical power to the heating element 24 based on a relationship between a measured temperature of one or more portions of the vaporizer assembly 90 and a temperature of one or more of the dispensing interface 25 and pre-vapor formulation included therein.

The control circuitry 11 may be configured to adjustably control the supply of electrical power to the heating element 24 to maintain the temperature of one or more portions of the vaporizer assembly 90 at or below a threshold temperature value. For example, the control circuitry 11 may be configured to adjustably control the supply of electrical power to the heating element 24 to maintain the temperature of one or more portions of the dispensing interface 25 and pre-vapor formulation held therein at or below a threshold temperature value.

The threshold temperature value may be a particular temperature value associated with a chemical reaction associated with the pre-vapor formulation. For example, the threshold temperature value may be a temperature at which the pre-vapor formulation may undergo a decomposition reaction. In another example, the threshold temperature value may be a temperature at which the pre-vapor formulation may react with one or more elements of the cartridge 70, etc.

The control circuitry 11 may be configured to maintain the temperature of one or more portions of the vaporizer assembly 90 at or below a threshold temperature value based on controlling the supply of electrical power according to a lookup table ("LUT") that associates separate values of temperature with separate values of electrical power. The LUT may include values of electrical power associated with separate temperature values at or above the threshold temperature value. Each of these electrical power values may be an amount of electrical power that, when supplied to the heating element 24, results in the vaporizer assembly 90 cooling to a temperature that is equal to or smaller than the threshold temperature value.

The electrical power values included in the entries of the LUT may be determined experimentally. For example, an amount of power supplied to the heating element 24 may be measured concurrently with a temperature of one or more portions of the vaporizer assembly 90 being measured. An electrical power value associated with a temperature value that exceeds the threshold temperature value may be an amount of electrical power that is experimentally determined to coincide with a measured vaporizer assembly 90 temperature that is less than the threshold temperature by a particular margin. The value of the margin may be a constant value. In some example embodiments, based on controlling the supply of electrical power to the heating element 24 according to a LUT, the control circuitry 11 may adjust the amount of electrical power supplied to maintain the measured temperature at or below a threshold value.

The threshold temperature value may be associated with a temperature above which one or more of the pre-vapor formulation or one or more materials included in the dispensing interface 25 are overheated. Overheating may result in degradation of pre-vapor formulation held in the e-vaping device 60. Such degradation may occur based on chemical reactions involving the pre-vapor formulation.

Vapors generated based on vaporization of a non-degraded pre-vapor formulation may provide an improved sensory experience relative to vapors generated based on vaporization of an at least partially degraded pre-vapor formulation. As a result, by adjustably controlling the supply of electrical power to the heating element 24 based on a temperature of one or more portions of the vaporizer assembly 90, including one or more of the heating element 24, the dispensing interface 25, and pre-vapor formulation held in the dispensing interface 25, the control circuitry 11 may mitigate a probability of overheating of one or more of the dispensing interface 25 and the pre-vapor formulation held therein.

Furthermore, such mitigation may result in an improvement of the sensory experience provided by a vapor generated via vaporization of pre-vapor formulation held in the dispensing interface 25.

In some example embodiments, the reservoir 22 is configured to hold different pre-vapor formulations. For example, the reservoir 22 may include one or more sets of storage media, where the one or more sets of storage media are configured to hold different pre-vapor formulations.

In some example embodiments, the dispensing interface 25 includes an absorbent material, the absorbent material being arranged in fluidic communication with the heating element 24. The absorbent material may include a wick having an elongated form and arranged in fluidic communication with the reservoir 22. The dispensing interface 25 may include a wicking material. The wicking material may be a fibrous wicking material. The wicking material may extend into reservoir 22.

A pre-vapor formulation, as described herein, is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or pre-vapor formulations such as glycerin and propylene glycol. Different pre-vapor formulations may include different elements. Different pre-vapor formulations may have different properties. For example, different pre-vapor formulations may have different viscosities when the different pre-vapor formulations are at a common temperature. One or more of pre-vapor formulations may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

The storage medium of one or more reservoirs 22 may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, one or more reservoirs 22 may include a filled tank lacking any storage medium and containing only pre-vapor formulation.

Still referring to FIG. 1A and FIG. 1B, the reservoir 22 may be sized and configured to hold enough pre-vapor formulation such that the e-vaping device 60 may be configured for vaping for at least about 200 seconds. The e-vaping device 60 may be configured to allow each vaping to last a maximum of about 5 seconds.

The dispensing interface 25 may include a wicking material that includes filaments (or threads) having a capacity to draw one or more pre-vapor formulations. For example, a dispensing interface 25 may be a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal direction of the e-vaping device 60. In some example embodiments, the dispensing interface 25 may include one to eight filament strands, each strand comprising a plurality of glass filaments twisted together. The end portions of the dispensing interface 25 may be flexible and foldable into the confines of one or more reservoirs 22. The filaments may have a cross-section that is generally cross-shaped, clover-shaped, Y-shaped, or in any other suitable shape.

The dispensing interface 25 may include any suitable material or combination of materials, also referred to herein as wicking materials. Examples of suitable materials may be, but not limited to, glass, ceramic- or graphite-based materials. The dispensing interface 25 may have any suitable capillarity drawing action to accommodate pre-vapor formulations having different physical properties such as density, viscosity, surface tension and vapor pressure.

The heating element 24 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 24 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 24 may include at least one material selected from the group consisting of stainless steel, copper, copper alloys, nickel-chromium alloys, super alloys and combinations thereof. In some example embodiments, the heating element 24 may be formed of nickel-chromium alloys or iron-chromium alloys. In some example embodiments, the heating element 24 may be a ceramic heater having an electrically resistive layer on an outside surface thereof.

In some example embodiments, the heating element 24 is a porous material that incorporates a resistance heater formed of a material having a high electrical resistance capable of generating heat quickly.

In some example embodiments, the cartridge 70 may be replaceable. In other words, once the pre-vapor formulation of the cartridge 70 is depleted, only the cartridge 70 may be replaced. In some example embodiments, the entire e-vaping device 60 may be disposed once the reservoir 22 is depleted.

In some example embodiments, the e-vaping device 60 may be about 80 mm to about 110 mm long and about 7 mm to about 8 mm in diameter. For example, the e-vaping device 60 may be about 84 mm long and may have a diameter of about 7.8 mm.

FIG. 2 is a cross-sectional view of an e-vaping device including an infrared sensor 81 internal to the vapor generator 80 within a cartridge 70, according to some example embodiments. The e-vaping device 60 shown in FIG. 2 may be included in any embodiments of e-vaping devices included herein.

In the example embodiment illustrated in FIG. 2, infrared sensor 81 included in a cartridge 70 is further included within vapor generator 80. Infrared sensor 81 has a field of view 83. A portion 214 of the field of view 83 encompasses a portion 222 of the vaporizer assembly.

As shown in FIG. 2, the field of view 83 may encompass a portion 222 that is an entirety of the vaporizer assembly 90. Where field of view 83 of the infrared sensor 81 encompasses an entirety of the vaporizer assembly 90, as shown in FIG. 2, the field of view 83 may encompass an entirety of the portion of the dispensing interface 25 extending through the central channel 20 between separate portions of the inner tube 62. Such a field of view 83 may also encompass an entirety of the portion of the heating element 24 extending through the central channel 20 between separate portions of the inner tube 62.

As shown in FIG. 2, the field of view 83 may be substantially free of any elements (obstructions) located between the infrared sensor 81 and the vaporizer assembly 90. As a result, a portion 214 of the field of view 83 that encompasses a portion 222 of the vaporizer assembly 90 is unobstructed. An infrared sensor 81 having such a field of view 83 may be referred to as having an "unobstructed" field of view 83 of the portion 222 of the vaporizer assembly 90.

In the example embodiment shown in FIG. 2, the portion 214 of the field of view 83 that encompasses the portion 222 of the vaporizer assembly 90 is an entirety of the field of view 83. However, it will be understood that, in some example embodiments, the portion 214 may be a limited portion of the field of view 83, such that a remainder portion of the field of view 83 excludes the portion 222 of the vaporizer assembly 90. For example, a remainder portion of the field of view 83 may encompass a portion of the inner tube 62.

In some example embodiments, an infrared sensor 81 included in the vapor generator 80 may have a field of view 83 that encompasses a greater portion 222 of the vaporizer assembly 90 than a field of view 204 of an infrared sensor 202 located external to the cartridge 70. For example, as shown in FIG. 2, an infrared sensor 202 external to the cartridge 70 has a field of view 204 that is partially obstructed 208 by the interfaces 74, 84 such that a limited portion 206 of the field of view 204 extends through the gap 201 in the interfaces 74, 84 to encompass a portion 220 of the vaporizer assembly 90.

The infrared sensor 81 included within the vapor generator 80, being directly coupled to the inner tube 62 and exposed to the central channel 20, has an unobstructed field of view 83 that encompasses an entirety of both the heating element 24 and the dispensing element 25 extending through the portion 222 of the vaporizer assembly 90.

In FIG. 2, portion 222 encompasses an entirety of the vaporizer assembly 90, but it will be understood that the field of view 83 may encompass different portions 222 of the vaporizer assembly 90 that are different from an entirety of the vaporizer assembly 90.

As a result, infrared sensor 81 may measure temperatures of a portion 222 of the vaporizer assembly 90, including the one or more portions of the heating element 24 and dispensing interface 25 included therein. Because portion 222 is greater than portion 220, the infrared sensor 81 may be configured to measure temperatures of a greater portion of the vaporizer assembly 90 than the infrared sensor 202, based on the infrared sensor 81 being included within at least the cartridge 70. In some example embodiments, the infrared sensor 81 may be configured to measure temperatures of a greater portion of the vaporizer assembly 90 than the infrared sensor 202, based on the infrared sensor 81 being included within the vapor generator 80.

Based at least in part upon reduced obstruction of a field of view 83 encompassing one or more portions 222 of the vaporizer assembly 90, the infrared sensor 81 may be configured to measure a temperature of one or more portions of the vaporizer assembly 90 with greater precision and accuracy, relative to the infrared sensor 202 located external to the cartridge 70.

Furthermore, a lack of obstructions in the field of view 83 may contribute to a reduced interference of field of view obstructions with temperature measurements by the infrared sensor 81 of portions of the vaporizer assembly 90 within the field of view 83, relative to temperature measurements by the infrared sensor 202 of portions of the vaporizer assembly 90 within the partially obstructed field of view 204.

In addition, the spacing distance 216 between the infrared sensor 81 included in the vapor generator 80 and the vaporizer assembly 90 may be less than the spacing distance 210 between the infrared sensor 202 and the vaporizer assembly 90. Because the infrared sensor 81 is closer than the infrared sensor 202 to the vaporizer assembly 90, the infrared sensor 81 may be configured to measure a temperature of one or more portions of the vaporizer assembly 90 with greater precision and accuracy, relative to the infrared sensor 202.

The infrared sensor 81 may be directly coupled to one or more elements included in the vapor generator 80. In the example embodiment illustrated in FIG. 2, the infrared sensor 81 is directly coupled to a portion of the inner tube 62. In some example embodiments, the infrared sensor 81 may be directly coupled to one or more of the gasket 15 and the gasket 18 (the gasket 18 is not shown in FIG. 2). In some example embodiments, the infrared sensor 81 may be directly coupled to one or more of the heating element 24 and the dispensing interface 25.

As shown in FIG. 2, an infrared sensor 81 directly coupled to one or more portions of the inner tube 62, gasket 15, etc. defining the central channel 20 may have a field of view 83 that both encompasses at least an entirety of the vaporizer assembly 90 and is unobstructed relative to the vaporizer assembly 90.

FIG. 3 is a cross-sectional view of an e-vaping device including an infrared sensor 81 that is within a cartridge 70 and external to the vapor generator 80 in the cartridge 70, according to some example embodiments. The e-vaping device 60 shown in FIG. 3 may be included in any embodiments of e-vaping devices included herein.

In some example embodiments, an infrared sensor 81 included in a cartridge 70 may be included external to a vapor generator 80 within the cartridge 70. As shown in the illustrated example embodiment of FIG. 3, the infrared sensor 81 may be included in the cartridge 70 and external to vapor generator 80 such that the field of view 83 of the infrared sensor 81 extends through the channel 14 in the gasket 15 into the central channel 20.

In some example embodiments, an infrared sensor 81 included in the cartridge 70 externally to the vapor generator 80 may have a field of view 83 that encompasses a greater portion 322 of the vaporizer assembly 90 than a field of view 204 of an infrared sensor 202 located external to the cartridge 70. For example, as shown in FIG. 3, a portion 320 of the field of view 83 of infrared sensor 81 is obscured by gasket 15, but an unobstructed portion 314 of the field of view 83 encompasses an entirety of the vaporizer assembly 90. Because the infrared sensor 81 is included in the cartridge 70, the infrared sensor 81 has a field of view that is not obstructed by interfaces 74, 84. The field of view 204 of the infrared sensor 202 external to the cartridge 70 is at least partially obstructed by interfaces 74, 84. As a result, the unobstructed portion 206 of the field of view 204 encompasses a portion 220 of the vaporizer assembly 90. The portion 220 is smaller than the portion 322 encompassed by the unobstructed portion 314 of the field of view 83.

Based at least in part upon reduced obstruction 320 of a field of view 83 encompassing one or more portions 322 of the vaporizer assembly 90, the infrared sensor 81 may be configured to measure a temperature of one or more portions of the vaporizer assembly 90 with greater precision and accuracy, relative to the infrared sensor 202 located external to the cartridge 70.

Furthermore, a reduced obstruction 320 of the field of view 83 of infrared sensor 81, relative to the obstruction 208 of the field of view 204 of infrared sensor 202, may contribute to a reduced interference of field of view obstructions with temperature measurements by the infrared sensor 81 of portions of the vaporizer assembly 90 within the field of view 83, relative to temperature measurements by the infrared sensor 202 of portions of the vaporizer assembly 90 within the partially obstructed field of view 204.

In addition, the spacing distance 316 between the infrared sensor 81 included in the cartridge 70 and the heating element 24 may be less than the spacing distance 210 between the infrared sensor 202 in the power supply section 72 and the heating element 24. Because the infrared sensor 81 is closer to the heating element 24, the infrared sensor 81 may measure a temperature of one or more portions of the vaporizer assembly 90 with greater precision and accuracy based on closer proximity of the infrared sensor 81 to the vaporizer assembly 90, relative to an infrared sensor 202 located in the power supply section 72.

Figure 4:
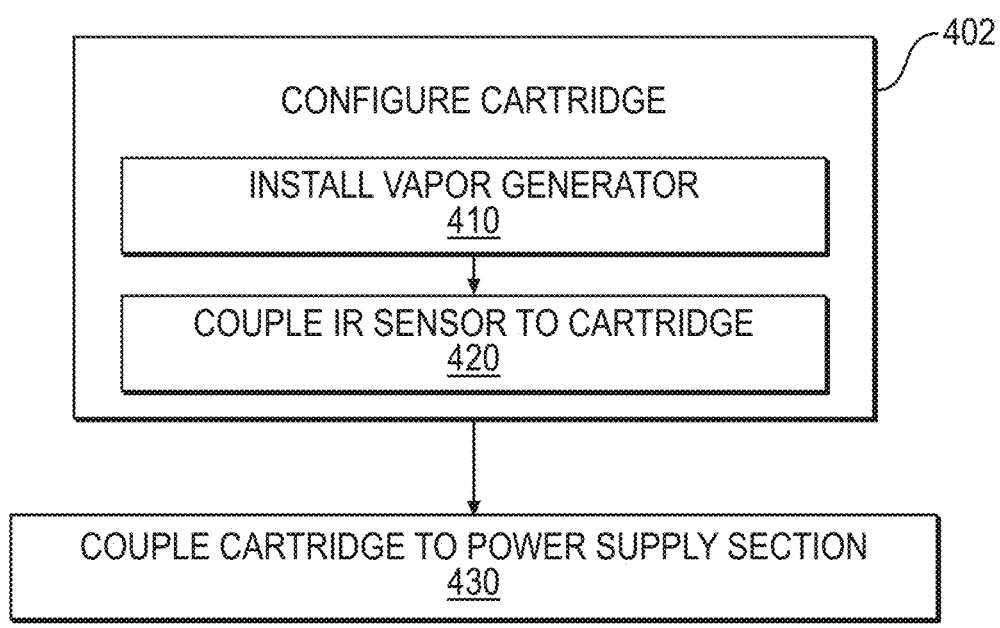
FIG. 4 illustrates configuring a cartridge to provide sensor data associated with a temperature of at least a portion of a vapor generator included in the cartridge, according to some example embodiments.

FIG. 4 illustrates configuring a cartridge to provide sensor data associated with a temperature of at least a portion of a vapor generator included in the cartridge, according to some example embodiments. The configuring may be implemented with regard to any embodiments of cartridge 70 included herein. The configuring may be implemented by one or more configurors. A configuror may include one or more of a human operator or a machine. When the configuror is a machine, the machine may implement the configuring based on a computer processing device executing program code stored on a computer readable storage medium. The machine may be a computer processing device.

Referring to FIG. 4, at 402, the configuror configures a cartridge to provide sensor data associated with a temperature of at least a portion of a vapor generator included in the cartridge, according to some example embodiments.

At 410, the configuror installs a vapor generator in the cartridge. In some example embodiments, a vapor generator includes a heating element and a dispensing interface. The installing may include at least one of coupling the heating element to the dispensing interface, coupling the dispensing interface to a portion of the cartridge, coupling the heating element to a portion of the cartridge, etc. In some example embodiments, a vapor generator includes gaskets at opposite ends of an inner tube, where the dispensing interface and heating element extend through a central channel defined by the inner tube, and the installing the vapor generator in the cartridge includes inserting the gaskets, inner tube, dispensing interface, and heating element within an outer housing of the cartridge. In some example embodiments, the vapor generator includes a reservoir and the installing the vapor generator in the cartridge includes inserting one or more storage materials comprising the reservoir into an annular space defined by the gaskets and inner tube of the vapor generator, and the outer housing of the cartridge.

At 420, the configuror couples an infrared sensor to the cartridge. The coupling may include directly coupling the infrared sensor to a portion of the vapor generator. For example, where the vapor generator includes an inner tube at least partially defining a central channel through which the dispensing interface and heating element extend, the coupling may include coupling the infrared sensor to a portion of the inner tube such that the infrared sensor is exposed directly to the central channel. In another example, the coupling may include directly coupling the infrared sensor to a portion of a gasket included in the vapor generator.

The coupling may include coupling the infrared sensor to a portion of the cartridge that is external to the vapor generator. In some example embodiments, the coupling includes coupling the infrared sensor to one or more electrical leads. The coupling may include coupling the one or more leads to one or more connector elements to couple the infrared sensor to the one or more connector elements through the one or more leads.

The coupling may include installing an electrical storage device in the cartridge. The coupling may include coupling the infrared sensor to the electrical storage device via one or more leads. The coupling may include coupling the storage device to one or more connector elements of the cartridge.

At 430, the configuror couples the cartridge to a power supply section. The coupling may include electrically coupling the heating element and the infrared sensor to a power supply in the power supply section.

The coupling may include communicatively coupling at least the heating element to control circuitry included in the power supply section such that the control circuitry may adjustably control the supply of electrical power to the heating element.

The coupling may include communicatively coupling at least the infrared sensor to control circuitry included in the power supply section such that the control circuitry may adjustably control the supply of electrical power to the heating element based on sensor data generated by the infrared sensor.

The coupling may include communicatively coupling at least a storage device included in the cartridge to control circuitry included in the power supply section such that the control circuitry may adjustably control the supply of electrical power to the heating element based on sensor data accessed from the storage device.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A cartridge, comprising:
a vaporizer assembly configured to vaporize a pre-vapor formulation to generate a vapor, the vaporizer assembly including,
a dispensing interface configured to draw the pre-vapor formulation from a reservoir,
a heating element coupled to the dispensing interface, the heating element configured to heat the drawn pre-vapor formulation,
a gasket, the gasket defining a channel; and
an infrared sensor configured to measure a temperature of at least a portion of the heating element within a field of view based on measuring infrared radiation emitted by the portion of the heating element, the infrared sensor coupled to a portion of the cartridge such that the infrared sensor is within the cartridge, and the field of view is directed to an interior of the cartridge, at least a portion of the field of view extending through the channel and the field of view partially obstructed by the gasket, and the field of view encompasses at least a portion of the vaporizer assembly.

2. The cartridge of claim 1, wherein the gasket is located between the infrared sensor and the vaporizer assembly.

3. The cartridge of claim 1, wherein:
the gasket extends between separate points of an outer housing enclosing the cartridge.

4. The cartridge of claim 1, further comprising:
a hollow tube having an inner surface and an outer surface, the vaporizer assembly extending between separate points on the inner surface of the hollow tube, the infrared sensor being directly coupled to the inner surface of the hollow tube.

5. The cartridge of claim 4, wherein the field of view includes a portion of the inner surface of the hollow tube.

6. The cartridge of claim 1, wherein the infrared sensor is configured to measure a temperature of at least a portion of the dispensing interface within the field of view based on measuring infrared radiation emitted by the portion of the dispensing interface.

7. An e-vaping device, comprising:
the cartridge of claim 1; and
a power supply configured to removably couple to the cartridge at an interface and to supply electrical power to the cartridge.

8. The e-vaping device of claim 7, wherein the infrared sensor is coupled to the interface.

9. The e-vaping device of claim 7, further comprising:
control circuitry configured to adjustably control the electrical power supplied to the cartridge based on the measured temperature of the heating element.

10. The e-vaping device of claim 9, wherein the control circuitry is configured to adjustably control the electrical power supplied to the cartridge to maintain the measured temperature of the heating element below a threshold temperature.

11. The e-vaping device of claim 9, further comprising
a storage device communicatively coupled to the infrared sensor, the storage device being configured to store sensor data generated by the infrared sensor; and
the control circuitry is configured to adjustably control the electrical power supplied to the cartridge based on accessing at least a portion of the sensor data stored at the storage device.

12. A method, comprising:
configuring a cartridge to provide sensor data associated with a temperature of at least a portion of a vaporizer assembly included in the cartridge, wherein the configuring includes;
installing the vaporizer assembly in the cartridge, the vaporizer assembly being configured to vaporize a pre-vapor formulation to generate a vapor, the vaporizer assembly including,
a dispensing interface, the dispensing interface being configured to draw the pre-vapor formulation from a reservoir,
a heating element, the heating element being coupled to the dispensing interface, the heating element being configured to heat the drawn pre-vapor formulation, and
a gasket, the gasket defining a channel; and
coupling an infrared sensor to a portion of the cartridge such that the infrared sensor is within the cartridge and such that at least a portion of the vaporizer assembly is within a field of view of the infrared sensor, at least a portion of the field of view extending through the channel and the field of view partially obstructed by the gasket the infrared sensor being configured to measure infrared radiation emitted within the field of view, the infrared sensor further configured to generate the sensor data based on the measured infrared radiation.

13. The method of claim 12, further comprising:
coupling a power supply to the cartridge at an interface.

14. The method of claim 13, wherein the coupling the infrared sensor to the portion of the cartridge comprises coupling the infrared sensor to the interface.

15. The method of claim 12, wherein the gasket extends between separate points of an outer housing enclosing the cartridge.

* * * * *